(12) United States Patent
Joeressen et al.

(10) Patent No.: US 6,622,011 B1
(45) Date of Patent: Sep. 16, 2003

(54) PAGING

(75) Inventors: Olaf J Joeressen, Düsseldorf (DE); Markus Schetelig, Essen (DE)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/404,718

(22) Filed: Sep. 24, 1999

(30) Foreign Application Priority Data

Sep. 24, 1998 (GB) .............................. 9820859

(51) Int. Cl.[7] ................................. H04B 1/40
(52) U.S. Cl. ................. 455/88; 455/73; 340/7.42; 340/7.43
(58) Field of Search .................... 455/903, 907, 455/73, 88, 550; 340/7.42, 7.43; 375/219, 220, 297, 316, 130, 132, 135, 136

(56) References Cited

U.S. PATENT DOCUMENTS

| | | | |
|---|---|---|---|
| 4,031,330 A | 6/1977 | van Leeuwen | |
| 4,554,668 A | * 11/1985 | Deman et al. | 54/68 |
| 4,558,453 A | 12/1985 | Mimken | |
| 4,829,540 A | * 5/1989 | Waggener et al. | 375/133 |
| 4,837,823 A | * 6/1989 | Ham et al. | 380/34 |
| 4,850,036 A | 7/1989 | Smith | |
| 5,533,025 A | 7/1996 | Fleek et al. | |
| 5,648,955 A | 7/1997 | Jensen et al. | |
| 5,790,536 A | 8/1998 | Mahany et al. | |

FOREIGN PATENT DOCUMENTS

WO  95/06377  3/1995

* cited by examiner

Primary Examiner—William Trost
Assistant Examiner—Congvan Tran
(74) Attorney, Agent, or Firm—Antonelli, Terry, Stout, & Kraus, LLP

(57) ABSTRACT

An improved paging procedure for use in a low power radio communications network.

A transceiver which pages a device by periodically transmitting a series of messages, comprises a transmitter which transmits a series of messages comprising a message at each frequency in a predetermined series of frequencies, a receiver which receives at, at least a predetermined frequency; and a controller which enables the transmitter and then the receiver in each of a plurality of successive periods and provides each message in said series of messages. The predetermined series of frequencies is an ordered series. A first message in the series of messages transmitted in a period defines directly or indirectly when the receiver is enabled and a second message in the series, a mark code, directly defines the predetermined frequency.

49 Claims, 2 Drawing Sheets ated slave transceiver is receiving. The master trans-
PAGING

BACKGROUND OF THE INVENTION

The present invention finds application in the field of paging and, in particular, the establishment of synchronisation between two transceivers. The invention relates to a method of paging, a transceiver for paging and a transceiver for being paged.

In a radio communication network a master transceiver may communicate to one or more slave transceivers. To enable communication links the master should be able to individually address each slave transceiver and to synchronise with the slave transceivers. It is important if frequency division multiplexing is used that a communication link is in a frequency channel shared between master and slave (frequency synchronisation). It is important that if time division multiplexing is used that the communication link uses a timing shared between the master and slave (timing synchronisation).

A paging routine is typically used to establish a communication link between a slave transceiver and the master transceiver. A paging routine typically involves: the slave transceiver being controlled to receive radio signals at a first receiving frequency; the master transceiver transmitting a paging message addressed to the slave transceiver at a first transmission frequency equal to the first receiving frequency; and the slave transceiver replying with a message addressed to the master transceiver at a second transmission frequency. A problem arises when the slave transceiver changes its first receiving frequency. In this case, the master transceiver may not be able to match the first transmission frequency with the first receiving frequency. It is therefore necessary for the master transceiver to transmit with different first transmission frequencies.

One proposal suggests that the master transceiver should transmit a paging message in a transmission time slot and then wait for a reply in an immediately following receiving time slot, for each of a sequence of different transmission frequencies. The frequency at which a reply is transmitted by a slave is determined by the frequency at which the preceding message received by the slave, was transmitted by the master. An advantage of the proposal is that the rigid time slot structure provides for simple timing synchronisation. The reception of a single message by a slave allows for timing and frequency synchronisation with the master. One problem with the proposal is that it may take an unnecessary amount of time for the master transceiver to transmit at the correct transmission frequency, that is, the one at which the addressed slave transceiver is receiving. The master transceiver has as much transmit activity as receiving activity thus half the air time is reserved for reception although only a single slave is paged.

It would be desirable to improve how synchronisation is established during paging.

SUMMARY OF THE INVENTION

According to one aspect of the present invention there is provided a transceiver for paging a device by periodically transmitting a series of messages, comprising: transmitter means arranged, when enabled, to transmit a series of messages comprising a message at each frequency in a predetermined series of frequencies; receiver means arranged, when enabled, to receive at, at least a predetermined frequency; and control means arranged to enable said transmitter means and then said receiver means in each of a plurality of successive periods and to provide each message in said series of messages.

The predetermined series of frequencies may be a series ordered in dependence upon the frequencies in the series. Each frequency in the series may be associated with an index and the ordering may take place on the basis of the index.

A first type of message in the series of messages may define when the receiver is enabled in that period. A second type of message if present in the series of messages may define the predetermined frequency for that period. In the preferred embodiment, in one period, there is a multiplicity of messages of the first type transmitted. One, none or more than one message of the second type may be transmitted in a period.

A message in the series may be of the first type, the second type or be both the first and second type. Messages of the first type and the second type may be differentiated using different preambles for transmitted radio packets addressed to the device.

According to another aspect of the present invention there is provided a transceiver, for being paged by a paging transceiver which periodically transmits a series of messages comprising a message at each frequency in an ordered sequence of frequencies and then receives at, at least a response frequency, comprising:

receiver means arranged to receive a message transmitted at a receiving frequency;

transmitter means for transmitting a message at a transmission time with a transmission frequency; control means arranged to control said transmitter means to establish timing and frequency synchronisation between said transmitter means and the paging transceiver, said control means being responsive to the receipt of a message in said ordered sequence to determine at least one of said transmission time and said transmission frequency.

According to a preferred embodiment of this paged transceiver, the control means is responsive to the receipt of a message of a first type, and in particular the receiving frequency on receipt of the message, to determine the transmission time and responsive to the receipt of a message of a second type, and in particular the receiving frequency on receipt of the message, to determine the next transmission frequency.

According to a further aspect of the present invention there is provided a method of paging a device using a paging transceiver, comprising: the steps of periodically: transmitting a series of messages comprising a message at each frequency in a predetermined sequence of frequencies, said series of messages being ordered in dependence upon the frequencies at which they are transmitted; then receiving at, at least a predetermined frequency; and then changing said predetermined frequency until a message is received.

According to a preferred embodiment of this method the series of messages comprises first messages and, if the predetermined frequency is a part of the series of frequencies, comprises a second message transmitted at the predetermined frequency. The predetermined sequence of frequencies may be determined by:

estimating the frequency at which the device will be receiving; calculating the next most likely frequencies at which the device will be receiving; and creating a sequence from said estimated and calculated frequencies.

BRIEF DESCRIPTION OF THE DRAWINGS

For a better understanding of the present invention and to understand how the same may be carried into effect reference will now be made to the accompanying drawings in which.

DETAILED DESCRIPTION

Figure 1:
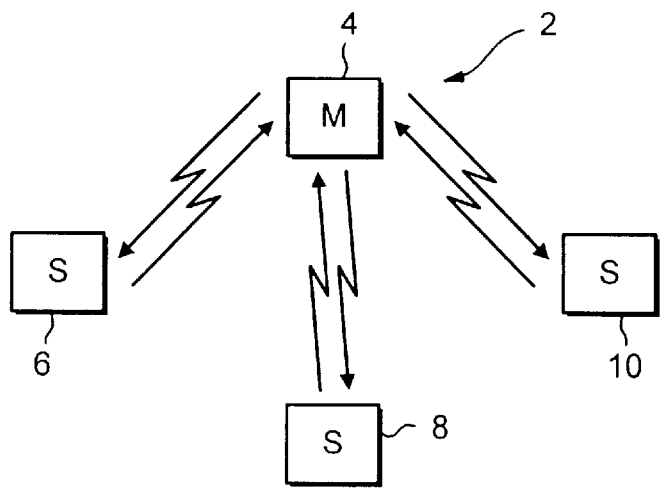
FIG. 1 illustrates a communications network including a master and slave units.

FIG. 1 illustrates a network 2 of radio transceiver units, including a master unit 4 and slave units 6, 8 and 10, communicating by transmitting and receiving radio packets. The master unit is the transceiver unit which initiates the connection of a slave to the network. There is only one master in a network. The network operates in a time division duplex fashion. A single packet is transmitted in the network at a time and the transceiver units are synchronised to a common time frame determined by the master unit 4. This time frame consists of a series of time slots of equal length. Normally, each radio packet transmitted in the network has its start aligned with the start of a slot and adjacent slots are assigned for respectively transmission and reception by the master unit. When the master unit is performing point-to-point communication a transmitted radio packet is addressed to a particular transceiver which replies to the master unit by transmitting a radio packet addressed to the master unit in the next available time slot. When the master unit is performing point to multi-point communication a transmitted radio packet is addressed to all transceiver units. Any time misalignment between the master and a slave is corrected by adjusting the timing of the slave.

The transceivers transmit and receive in a microwave frequency band, typically 2.4 GHz.

The network reduces interference by changing the frequency at which each radio packet is transmitted. A number of separate frequency channels are assigned each with a bandwidth of 1 MHz, and the frequency hops at a rate of 1600 hops/s. The frequency hopping of the transceivers communicating in or joining the network is synchronised and controlled by the master unit. The sequence of hopping frequencies is unique for the network and is determined by a unique identification of the master unit. Each transceiver unit has a unique identification, the Unit ID, henceforth referred to as the Slave ID for the slave units and the Master ID for a master unit.

The network is a radio frequency network suitable for transmitting voice information or data information between transceivers. The transmissions made are of low power, for example 0 to 20 dBm, and the transceiver units can effectively communicate over the range of a few centimetres to a few tens or hundred of metres. The master unit has the burden of identifying the other transceiver units within its transmission range and the burden of paging a transceiver unit to set up a communication link between the master unit and that slave unit. Each of the slave units has a low power mode in which it neither transmits nor receives and other modes in which it receives and then responds to radio packets addressed to it by the master unit. A slave unit may remain in the low power mode except when transmitting or receiving.

Figure 2:
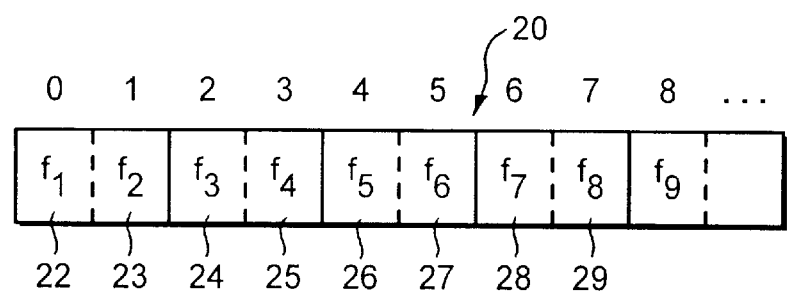
FIG. 2 illustrates the time frame of the communications network.

Referring to FIG. 2, a frame 20 is illustrated. This frame 20 is the common time frame used by the network 2 and controlled by the master unit 4. The frame illustratively has slots 22 to 29. The slots designated by even numbers are normally reserved. Only the master unit can normally begin transmitting a radio packet aligned with the start of the even numbered slots. The slots designated by odd numbers are normally reserved. Only radio packets transmitted by a slave, that is radio packets addressed for reception by the master unit can normally have their start aligned with the start of the odd numbered slots. Each slot is allocated a different one of a sequence of hopping frequencies. A slot has a constant time period and is typically 625 microseconds.

Figure 3:
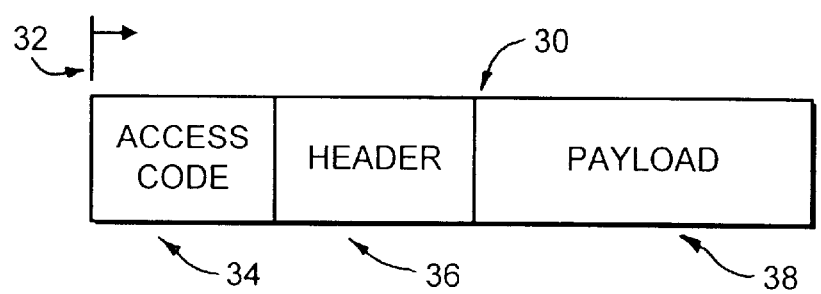
FIG. 3 illustrates a radio packet.

Referring to FIG. 3, a typical radio packet 30 is illustrated. The radio packet has a start 32 and contains three distinct portions: a first portion contains an Access Code 34, a second portion contains a Header 36 and a third portion contains a Payload 38.

The Access Code is a series of symbols used in the network to identify the start of a radio packet. It has a fixed length. The Access Code may comprise a Master ID, a Slave ID or an Inquiry Access Code. In a normal communication mode, the master and slave units use the Master ID as the Access Code. As there is only one master unit in a network, the Master ID identifies the network. When the master unit is in a Page Mode and is paging a particular slave unit to set up a communication link between itself and the slave unit, the Slave ID is used as the Access Code when the master addresses the slave and the slave replies. When the master unit is in an Inquiry Mode, the Inquiry Access Code is used as the Access Code when the master unit addresses the transceiver units and when a unit replies. The Inquiry Access Code identifies a packet as one to which all transceiver units must respond by transmitting their Slave ID.

The header 36 may or may not be present. If present, it has a fixed length. The header contains control words. The local address (L_ADDR) is a word uniquely identifying a slave within a network. The local address is assigned to a slave unit by the master unit when the master unit joins the slave to the network. The all zero L_ADDR is reserved for broadcast purposes. The packet identification word (PK_ID) specifies the features of the radio packet 30. PK_ID specifies whether a payload is present and its size and whether the payload contains data or transceiver control information.

The payload 38 carries either transceiver control information or voice/data information. The payload is of variable length and may be absent. When a slave unit receives a packet transmitted by a master unit in the Inquiry Mode it transmits a packet containing transceiver control information in its payload. This controlling radio packet has a payload containing at least two control words. The first is the Unit ID (SLAVE ID) of the slave unit and the second is the value (SLAVE CLK) representing the local time kept by a clock in the slave unit. The controlling radio packet is used to allow the slave to establish frequency and timing synchronisation with the communication network. When a master unit is in the Page Mode it transmits a radio packet to the paged slave containing transceiver control information in its payload. This controlling radio packet has a payload containing at least two control words. The first is the Unit ID (MASTER ID) of the master unit and the second is a value (MASTER CLK) representing the local time kept by a clock in the master unit. The controlling radio packet is used by the slave to establish timing and frequency synchronisation with the network.

Figure 4:
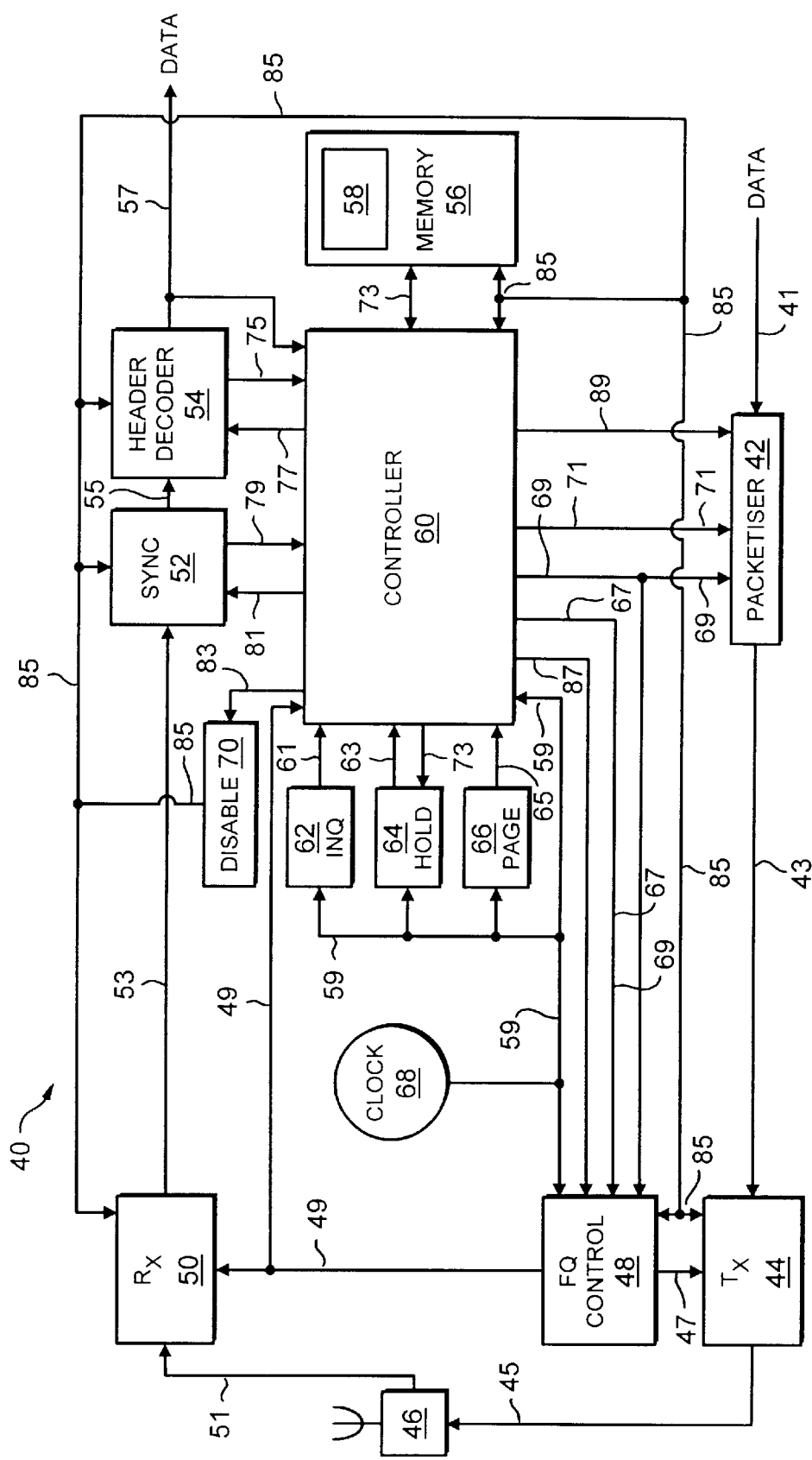
FIG. 4 illustrates a transceiver unit suitable for use as a master or slave.

Referring to FIG. 4, a schematic illustration of a transceiver unit is shown. Only as many functional blocks and interconnections are shown in this diagram as are necessary to explain in the following how a transceiver unit and the communication network operates. The transceiver unit 40 contains a number of functional elements including: an antenna 46, receiver 50, synchroniser 52, header decoder 54, controller 60, memory 56 having memory portion 58 storing the transceiver unit's Unit ID, disable circuitry 70, packetiser 42, clock 68, inquiry counter 62, hold counter 64, page scan counter 66, frequency hop controller 48 and transmitter 44. Although these elements are shown as separate elements they may in fact be integrated together and may be carried out in software or in hardware.

Data to be transmitted in the payload of a packet by the transceiver unit 40 is supplied as data signal 41 to the packetiser 42. Control information to be transmitted in the payload of a packet is supplied in a payload control signal 89 provided by the controller 60 to the packetiser 42. The packetiser 42 also receives an access code control signal 69 and a header control signal 71 from controller 60 which respectively control the Access Code 34 and the Header 36 attached to the payload to form the packet. The packetiser 42 places the data or control information into a packet 30 which is supplied as signal 43 to the transmitter 44. The transmitter 44 modulates a carrier wave in dependence upon the signal 43 to produce the transmitted signal 45 supplied to the antenna 46 for transmission. The frequency of the carrier wave is controlled to be one of a sequence of hop frequencies by a transmission frequency control signal 47 supplied by the frequency hop controller 48 to the transmitter 44.

The antenna 46 receives a radio signal 51 and supplies it to the receiver 50 which demodulates the radio signal 51 under the control of a reception frequency control signal 49 supplied by the frequency hopping controller 48 to produce a digital signal 53. The digital signal 53 is supplied to the synchroniser 52 which synchronises the transceiver unit 40 to the time frame of the network. The synchroniser is supplied with an access code signal 81 specifying the Access Code of the packet which the transceiver unit is expecting to receive. The synchroniser accepts those received radio packets with Access Codes which correspond to the expected Access Codes and rejects those received radio packets with Access Codes that do not correspond to the expected Access Code. A sliding correlation is used to identify the presence and the start of the expected Access Code in a radio packet. If the radio packet is accepted then the radio packet is supplied to the header decoder 54 as signal 55 and a confirmation signal 79 is returned to the controller 60 indicating that the packet has been accepted by the synchroniser 52. The confirmation signal 79 is used by the controller in a slave unit to resynchronise the slave clock to the master clock. The controller compares the time at which a radio packet was received with the time at which the radio packet was expected to be received and shifts its timing to offset the difference. Such an offset may be achieved by varying the value of M_OFFSET stored in memory 56 by the value of the difference. The header decoder 54 decodes the header in the received packet and supplies it to the controller 60 as header signal 75. The header decoder 54, when enabled by a payload acceptance signal 77 supplied by the controller 60, produces a data output signal 57 containing the remainder of the radio packet, the payload 38. The controller responds to a zero value of L_ADDR in the header signal 75 to enable the header decoder. The data output signal 57 may contain transceiver control information. In this instance the data output signal 57 is supplied to controller 60 in response to the payload acceptance signal 77 provided by the controller 60.

The frequency-hopping controller 48 cycles through a sequence of frequencies. The transmission frequency control signal 47 and the reception frequency control signal 49 normally alternately control the transmitter 44 and the receiver 50. When the transceiver 40 is acting as a master, the receiver 50 is normally capable of receiving at frequencies determined by the odd values of the sequence and the transmitter is normally capable of transmitting at frequencies determined by the even values of the sequence. When the transceiver is acting as a slave unit the reverse is true. The frequency-hopping controller 48 receives the access code control signal 69 (also supplied to the packetiser 42) and an offset signal 67 from the controller 60 and a clock signal 59, which represents the time held in clock 68, from the clock 68. The offset signal 67 defines the value of an offset from the time held in the clock 68. This value may be null. The frequency-hopping controller combines the clock signal 59 and the offset signal 67 to emulate the time held in a clock offset by the value of the offset signal 67 from the clock 68. The sequence of frequencies through which the hopping controller 48 cycles is dependent upon the access code control signal 69. The position within the cycle is dependent upon the emulated time. When the access code control signal 69 provides the value MASTER ID a master unit frequency-hopping sequence is defined. When the access code control signal 69 provides the value SLAVE ID a slave unit frequency-hopping sequence is defined.

The clock 68 also supplies the clock signal 59 to the inquiry counter 62, the hold counter 64 and the page scan counter 66. Each of the counters contains values which are decremented with each clock cycle of the clock 68. The counters supply a control signal to the controller 60 when the decremented value reaches a predetermined threshold. The Inquiry counter 62 produces an inquiry control signal 61 every few seconds. This signal causes the transceiver unit 40 to enter the Inquiry Mode and the counter 62 to be reset. The hold counter 64 produces a hold disable signal 63 which causes the transceiver unit to exit a Hold Mode. The controller 60 initiates a Hold Mode by writing a value into the Hold counter 54 via write signal 73. The page scan counter 66 produces a page scan control signal 65 every few seconds. This signal causes the transceiver unit to enter the Page Scan Mode and the counter 66 to be reset.

Disable circuitry 70 provides an enable signal 85 to the receiver 50, the synchroniser 52, the header decoder 54, the frequency-hopping controller 48, the transmitter 44 and the packetiser 42, the memory 56 and the controller 60 in the absence of which these elements would be switched off. The disable circuitry responds to an asserted disable control signal 83 supplied by the controller 60 to disassert the enable signal 85.

The memory 56 has a portion 58 which permanently stores the Unit ID of the transceiver unit 40 and the common Inquiry Access Code. The remaining portion of the memory 56 can be written to by the controller 60. If the transceiver unit 40 is functioning as a slave unit, the memory 56 will additionally store the Master ID, a value M_OFFSET representing the difference between the slave unit's clock and the master unit's clock and the slave's address in the network, L_ADDR. If the transceiver unit 40 is functioning as a master unit, the memory 56 will additionally store for each slave unit participating in the network: the Slave ID; a value S_OFFSET representing the difference between the master unit's clock and that particular slave unit's clock and L_ADDR uniquely identifying the particular slave unit in the network.

It should be noted that the access code signal 81, the access code control signal 69 and the offset signal 67 in the communication mode remain the same for adjacent duplex time slots, and that the access code signal 81 and the access code control signal 69 will have the same values.

The transceiver unit has various modes of operation including: the Standby Mode, the Communication Mode, the Inquiry Mode, the Page Mode, and the Hold Mode. The operation of the controller 40 in each of these modes may depend upon whether the transceiver unit is functioning as a master or as a slave.

Standby Mode

Before a transceiver unit 40 has been connected to a network it is in Standby Mode. To enter this Mode the controller 60 activates the disable control signal 83. The receiver 50, the transmitter 44, the synchroniser 52, the frequency-hopping controller 48, the header decoder 54, the packetiser 42, disable circuitry 70 and the controller 60 are disabled and do not draw power. Only the clock 68 and the counters 62, 64 and 66 are operational. In this mode power consumption is very low.

Inquiry Mode

Before a master unit can set up a communication network or join a transceiver unit to an existing network it needs to 'know' what transceiver units are within its transmission range. The master unit broadcasts inquiry radio packets in even numbered time slots. Each of the packets has the Inquiry Access Code as its Access Code and the zero L_ADDR in its header. If a slave unit is within range and is also in an Inquiry Mode it will respond in an odd numbered time slot, by transmitting a packet which has the Inquiry Access Code as its Access Code and has, in its payload, the SLAVE ID and SLAVE CLK of the slave unit.

Paging

Before a master unit can join a transceiver to the communication network it establishes timing and frequency synchronisation with the slave by paging the slave. Synchronisation is established by sending a paging message to the slave and receiving a reply message from the slave. Once the master has synchronised to the slave it communicates network parameters to the slave using the slave hopping sequence. The network parameters allow the slave to synchronise with the network by defining master hopping sequence used by the communication network.

A slave unit is susceptible of being paged when it is in the page scan mode. This mode is activated by the page counter 66. In the page scan mode the slave transceiver receives continuously at a frequency determined by the page scan hopping sequence $F=\{f_0 \ldots f_{N-1}\}$. This sequence is the same as, or a sub-set of, the slave hopping sequence derived from the slave unit's SLAVE ID but instead of having a period between hops of one time slot it has a longer period T, typically equal to 1.28s. The elements of the page scan hopping sequence $f_0 \, f_1 \, f_2 \, \ldots \, f_{N-1} \, f_N$ may be a pseudo-random sequence of frequencies. The frequency at which the slave transceiver receives is defined by $f_n \epsilon F$ where the index $n=[\text{INT}(t_s/T)] \bmod N$, $t_s$ being the local time in the slave, N being the number of elements in the hopping sequence F, INT(x) being the integer part of the fraction x, and [y] mod N being $y-a^x N$ where a is a whole number chosen such that $0 \leq y-a^x N < N$. Consequently, in the page scan mode the slave transceiver hops its frequency once every T seconds although the frequencies at which it can receive are determined by the slave hopping sequence F. When the slave unit receives a paging message it replies by transmitting a reply message at a frequency $f_m$ chosen from the set $F'=\{f_0 \ldots f_{M-1}\}$ The master unit establishes timing and frequency synchronisation with the slave by transmitting a paging message to the slave and receiving a reply from the slave. According to the paging scheme described below, the master transceiver has alternate transmission and reception cycles. The master transceiver transmits, in the transmission cycle, a series of paging messages. It then stops transmitting and controls its receiver to receive reply messages, sent in reply to one of those paging messages, for the duration of the reception cycle. If no reply message is received the train of transmission cycle followed by reception cycle repeats. The cycles within the train are concatenated and the trains are concatenated.

The master transceiver knows the sequence of frequencies used by a particular slave transceiver to receive paging messages (the slave hopping sequence F) but it cannot be sure of the particular slave's position (n) within that sequence as it is not sure of the clock value $t_s$. The series of paging messages is made up of a message at each frequency in a predetermined series of frequencies. This series of frequencies is an ordered series and is derived from a set A of the most likely frequencies at which the slave transceiver being paged is receiving. The set A is a sub-set of the slave hopping sequence F. The ordering of the series of frequencies is predetermined by an algorithm known to the master and slave.

When the master transceiver is controlled to receive a reply to the paging messages, it is controlled to receive at a sequence of U receiving frequencies. The U frequencies which form a receiving cycle are a sub-set of a reception hopping sequence $F'=\{f'_0 \ldots f'_{M-1}\}$) Typically U is 1 or 2. The U receiving frequencies change each time the train repeats. In a first train the U frequencies are $f'_0 \ldots f'_{U-1}$, in the next train they are $f'U \ldots f'_{2U-1}$ etc. The U receiving frequencies repeats with a periodicity of M/U trains. The slave transceiver may know the set F' which is used by the master transceiver, but it does not know where in the cycle of the repetition of trains the master transceiver is nor does it know when the master transceiver is expecting to receive a reply message.

A first type of paging message is used as a member of the series of paging messages to address a slave transceiver and to indicate to the slave transceiver the time at which the master transceiver is controlled to receive a reply message. This indication occurs via the frequency of the received first message and the knowledge the slave has of the ordering algorithm. The indication may be direct or indirect. A direct indication may be that a single received message allows the slave transceiver to "know" through the ordering algorithm the time at which the master transceiver is controlled to receive a reply message. An indirect indication may be that the received message allows the slave transceiver, through the ordering algorithm, to receive a further message or messages which allow the slave transceiver to "know" (predict) the time at which the master transceiver is controlled to receive a reply message.

A second type of paging message, a mark code, is used as a member of the series of paging messages to indicate to the slave transceiver where in the reception hopping sequence F' the master transceiver currently is and consequently the frequency at which the master transceiver is expecting to receive a reply message. This indication occurs via the frequency of the received mark code.

A paging message is a radio packet having a preamble and no header or payload which typically occupies half of a time slot. The preamble of the packet for the first type of message contains the SLAVE ID of the paged slave unit. The preamble of the second type of message identifies it as a second type of message. In a preferred embodiment the second type of message is a radio packet which has as its preamble the inverted SLAVE ID. In this preferred embodiment the second type of message acts as both a first and second type of message. Its reception defines the time at which the slave can transmit to the master and defines the frequency at which the slave transmits a reply message to the master. The reply message is also a radio packet without header or payload which has SLAVE_ID as its preamble.

It should be appreciated that in this paging scheme odd and even numbered time slots are no longer reserved for transmission from and to the master. The train consists of the concatenation of a transmitting cycle and a receiving cycle and spreads over multiple time slots.

For a master transceiver to page a slave it has to be able to transmit a paging message at the frequency at which the slave is receiving. However, before paging has established synchronisation between the master and slave, the master cannot accurately determine the frequency at which the slave is receiving. The master transceiver therefore makes an estimate $t_s'$ of the local time $t_s$ in the slave transceiver. If $t_m$ is the local time in the master transceiver, then $t_s = S\_OFFSET + t_m$ The master transceiver estimates the most probable frequency $f_n$ at which the slave is receiving, where index n'=INT ($t_s'$/T) mod N. The slave hopping sequence is then divided into two distinct sets A and B each having the same number of elements. Set A contains the most probable frequency and those frequencies in the hopping sequence adjacent to it. The set B contains the remaining frequencies in the hopping sequence. The set A is used by the master unit first to page the slave. If this is unsuccessful, set B is then used. The set A contains the frequencies $f_i$ from the set $F=\{f_0 \ldots f_{N-1}\}$ for all i such that, [(n'-i+N/4) mod N]<N/2. If set A contains $f_x$, set B would contain $f_{[x+N/2] mod N}$. Thus set A contains either $f_0$ or $f_{N/2}$ and either $f_{N/2-1}$ or $f_{N-1}$. The sets A' and B' are recalculated every period T.

The set A is ordered using an algorithm to produce an ordered set A'. The ordering is dependent upon the frequency values of the members of set A. The set A' defines as a sequence the order of the frequencies the master transceiver transmit$_s$ the series of paging messages during the transmission cycle of a train. The algorithm may define that the set A' is static for example the set A' may not be altered until set A changes. Alternatively, the algorithm may define that set A' is dynamically altered in a predetermined manner. For example, the algorithm may define that the components of the set A' may remain unaltered and the ordering of the set remain unaltered but that there is a cyclic rotation of the members of the set A' for each transmission cycle so that the starting frequency of the series of transmissions changes for each transmission cycle in accordance with the ordering of the set A'. The algorithm is known to both the slave and master transceivers. The slave transceiver uses its knowledge of the algorithm and its knowledge of the frequency of a received first message to determine information about the current train. This information may be, for example, when the reception cycle starts or expected frequency of the next message. The information is used by the slave to make a decision about the timing of a response to the master and/or the frequency of that response or is used by the slave to receive later messages (such as mark codes) in the transmission cycle which provide information which allow these decisions to be made.

The master and slave obtain frequency and time synchronisation by exchanging information. They share knowledge of a predetermined algorithm which defines the order of frequencies used in the transmission cycle by the master. They also share a knowledge of the predetermined structure of the train, transmission cycle and reception cycle. In the slave transceiver, the frequency of a received message thereby provides information that indirectly (through the reception of other messages) or directly allows the slave to obtain timing and/or frequency synchronisation with the master.

For the purposes of illustration the use of a predetermined static algorithm with a number of different train structures is given below. In these examples the algorithm allows a slave transceiver which has received a first message to determine the time at which the master expects to receive a transmission from the slave. In these examples, the second type of message, the mark code, is also a first type of message and the transmission cycles are N/2 messages long.

The set A is ordered to produce a set A' which defines as a sequence the order of the frequencies at which the master transceiver transmits a series of paging messages in the transmission cycle of each train. One message is transmitted at each frequency in the set A'. The set is ordered according to [i]mod(N/2). Thus set A begins with either $f_0$ or $f_N$, ends with either $f_{N/2-1}$ or $f_{N-1}$ and for each value of x contains either $f_x$ or $f_{x+N/2}$. Likewise set B is ordered in the same manner to produce set B' defining a sequence. Set A' and B' have a common characteristic. A member of either set, $f_k$, will be positioned [k]mod(N/2) places from the front of the sequence and N/2-[k]mod(N/2) places from, the end of the sequence. Consequently as the slave hopping sequence is known and used in a slave transceiver, the time at which the master expects to receive a reply message can be derived from the frequency at which a first type of paging message is received by the slave transceiver. A slave transceiver react$_s$ to the reception of a first type of paging message to establish the time at which it should transmit a reply message i.e. the time at which the master transceiver expects to receive a reply message. The master transceiver can thus establish timing synchronisation with the slave. To establish frequency synchronisation with the slave (with respect to the reply frequencies) the master needs to indicate which frequencies in the set F' will be used in the following receiving cycle. A second type of message, a mark code, is used to indicate to the slave transceiver the frequency at which it should reply. A mark code is sent at a particular frequency in the transmission cycle of a train if that particular frequency is the or one of the frequencies at which the master receives reply messages in the following receiving cycle.

Several possibilities exist concerning the reception hopping sequence F' used to define the frequencies at which the master transceiver receives reply messages. In the following examples, it is assumed that the slave frequency sequence has 8 elements (N=8) and that the estimated index of the scanning frequency by the master is 7 i.e. n'=7. Consequently the sets A and B are:

A=$\{f_7, f_0, f_1, f_6\}$ and B=$\{f_2, f_3, f_4, f_5\}$

The sets A' and B' are

A'=$\{f_0, f_1, f_6, f_7\}$ and B'=$\{f_4, f_5, f_2, f_3\}$

The transmitting cycle of a train based on set A' is a concatenated series of message where each message is transmitted at a different frequency $f_x$ and is represented by $f_x$. The receiving cycle of a train based on set A' is a concatenated series of receiving periods each period represented by $R_x @ f_x$ where the receiver receives at a frequency $f_x$:

The train of transmitting and receiving cycles is repeated with different receiving cycles $f_0, f_1, f_6, f_7, R_x @ f_x, R_x @ f_{x+1}$ $f_0, f_1, f_6, f_7, R_x @ f_{x+U}, R_x @ f_{x+U+1}$ $f_0, f_1, f_6, f_7, R_x @ f_{x+2U}, R_x @ f_{x+2U+1} \ldots$ $f_0, f_1, f_6, f_7, R_x @ f_{M-2}, R_x @ f_{M-1}$ $f_0, f_1, f_6, f_7, R_x @ f_x, R_x @ f_{x+1}$ In the following a mark code transmitted at the frequency $f_x$ is described by $Mk@f_x$.

According to a first scheme U=1 and F' is identical to the sequence of frequencies (A', B') at which the master transceiver is transmitting at that time defines F'. Continuing this example in which $F'=\{f'_0, f'_1, f'_2, f'_3\}$ and $A'=\{f_0, f_1, f_6, f_7\}$, N=8, n'=7 and U=1, the master operates with the following trains of transmit and receive cycles:

| | | |
|---|---|---|
| $Mk@f_0, f_1, f_6, f_7, Rx@f_0$, | (first train) | (1st period) |
| $f_0, Mk@f_1, f_6, f_7, Rx@f_1$, | (2nd train) | (2nd period) |
| $f_0, f_1, Mk@f_6, f_7, Rx@f_2$, | (3rd train) | (3rd period) |
| $f_0, f_1, f_6, Mk@f_7, Rx@f_3$, | (4th train) | (4th period) |
| $Mk@f_0, f_1, f_6, f_7, Rx@f_0, \ldots$ | (fifth train = first train) | (5th period) | where there is a defined one to one correspondence between F' and A'. For the purpose of this example, the correspondence is defined as: $f'_0 \leftrightarrows f_0$; $f'_1 \leftrightarrows f_1$ ; $f'_2 \leftrightarrows f_6$; $f'_3 \leftrightarrows f_7$.

The slave being paged uses the slave hopping sequence $F=\{ f_0, f_1, f_2, \ldots f_{N-1}\}$. According to this embodiment the slave will know that the transmit cycle will contain N/2 messages including a message at $f_i$ or $f_{N/2+i}$, for i=0,1 ... N/2−1. The reception of a mark code completely defines the frequency at which the slave will transmit a reply message in that train, but does not completely define F'.

According to a second scheme, $F'=\{ f_0, f_{N/2}, f_1, f_{N/2+1} \ldots f_{N/2-1}, f_{N-1},\}$ and U=1. F' is defined by the set F and is ordered such that element$_s$ in the set F' are ordered pairs ($f_x, f_{x+N/2}$). The pairs are such that for any pair both elements of the pair do not belong to only set A or to only set B. Continuing with an example in which N=8, n'=7, U=1 and $F'=\{f_0, f_{N/2}, f_1, f_{N/2+1} \ldots, f_{N/2-1}\}$:

| | | |
|---|---|---|
| $Mk@f_0, f_1, f_6, f_7, Rx@f_0$, | (first train) | (1st period) |
| $f_0, \quad f_1, f_6, f_7, Rx@f_4$, | (2'nd train) | (2nd period) |
| $f_0, Mk@f_1, f_6, f_7, Rx@f_1$, | | (3rd period) |
| $f_0, \quad f_1, f_6, f_7, Rx@f_5$, | | (4th period) |
| $f_0, \quad f_1, f_6, f_7, Rx@f_2$, | | (5th period) |
| $f_0, f_1, Mk@f_6, f_7, Rx@f_6$, | | (6th period) |
| $f_0, \quad f_1, f_6, f_7, Rx@f_3$, | | (7th period) |
| $f_0, f_1, f_6, Mk@f_7, Rx@f_7$, | (8'th train) | (8th period) |
| $Mk@f_0, f_1, f_6, f_7, Rx@f_0, \ldots$ | (9th train = first train) | (9th period) |

The slave being paged knows the set F' and that U=1. The reception of a mark code therefore completely defines the frequency at which the slave transmits in that and the following trains. However, a mark code is not transmitted in every train. In this example the mark code is transmitted at the same frequency as that at which a reply message is expected. This is one example of the many mappings which could be used to map the frequency at which a mark code is transmitted at, to the frequency at which a reply message is expected.

According to a preferred third scheme, $F'=\{f_0, f_{N/2}, f_1, f_{N/2+1} \ldots, f_{N/2-1}, f_{N-1}\}$ as in the second embodiment and U=2. The elements of the set F' are ordered in pairs $f_x, f_{x+N/2}$ such that for any pair both elements of the pair do not belong to only set A or to only set B. Continuing with an example in which N=8, n'=7, U=2 and $F'=\{ f_0, f_{N/2}, f_1, f_{N/2+1} \ldots, f_{N/2-1}, f_{N-1}\}$

| | | |
|---|---|---|
| $Mk@f_0, f_1, f_6, f_7, Rx@f_0, Rx@f_4$, | (first train) | (1st period) |
| $f_0, Mk@f_1, f_6, f_7, Rx@f_1, Rx@f_5$, | | (2nd period) |

-continued

| | | |
|---|---|---|
| $f_0, f_1, Mk@f_6, f_7, Rx@f_2, Rx@f_6$, | | (3rd period) |
| $f_0, f_1, f_6, Mk@f_7, Rx@f_3, Rx@f_7$, | (4'th train) | (4th period) |
| $Mk@f_0, f_1, f_6, f_7, Rx@f_0, Rx@f_4. \ldots$ | (fifth train = first train) | (5th period) |

The slave being paged knows F' and that U=2. The frequencies at which reply messages can be sent in the transmit cycle of each train are defined by $f_x, f_{x+N/2}$ for x=0, 1, ... N/2−1. The reception of a mark code therefore completely defines the frequency at which the slave transmits in that train and the following trains. In this preferred scheme, there is an opportunity to receive a mark code in every train.

The above examples illustrate possible paging schemes. In the preferred embodiment, the slave hopping sequence has 32 elements (N=32), U=2, $F'=\{f_0, f_{N/2}, f_1, f_{N/2+1} \ldots, f_{N/2-1}, f_{N-1}\}$, $F=\{f_0, f_2 \ldots f_{N-1}\}$, each or received in a half a time slot and the second message type also functions as a first message type.

Referring to FIG. 4, the transceiver illustrated, when functioning as a paging master, uses the frequency hopping controller 48 to control the frequency and timing with which the master transceiver transmits and the packetiser 42 to define the type of message transmitted. The frequency hopping controller 48 receives offset signal 67, access code control signal 69 and a control signal 87 from the controller 60.

The access code control signal supplies the value of the SLAVE ID of the slave being paged. The frequency hopping controller derives the slave hopping sequence F from this value. The offset signal 67 supplies the value of S_OFFSET for the slave being paged from memory 56. The frequency hopping controller 48 also receives the clock signal 59 having a value $t_m$. It uses the clock signal 59 and the offset signal 67 to make an estimate $t'_s = t_m + S\_OFFSET$ of the clock value in the paged slave. The control signal 87 supplies the value of T used by the paged slave and controls the construction of the page scan hopping sequence F. The values of $t_s$ and T are used to calculate and order the sets A' and B' from the sequence F. Initially, during each transmission cycle of each train the frequency hopping controller provides a sequence of transmission frequency control signals 47 corresponding to the set A'. This continues for a predetermined number of trains, then the sequence of transmission frequency control signals 47 are made to correspond to set B'. The sets A' and B' are recalculated every period T.

The controller 60 controls the contents of the messages transmitted. In the preferred embodiment, the controller identifies a paging message of the first type by setting the access code control signal equal to the SLAVE ID and identifies a paging message of the second type by setting the access code control signal equal to the inverse of SLAVE ID. This does not affect the functioning of the frequency hopping controller 48. Alternatively a flag could be attached to the access code control signal 69 set equal to the SLAVE ID. One value of the flag would indicate a first message type and another value would indicate a second message type.

During each reception cycle of each train the frequency hopping controller provides a reception frequency control signal 49 or a sequence of reception frequency control signals 49 depending upon F', U and $t_m$ to control the receiver 50. The control signal 87 supplied by the controller 60 to the frequency hopping controller identifies whether the first, second or third schemes exemplified above are to be used and determines the reception hopping sequence F'. The controller 60 also provides to the synchroniser 52 the value of SLAVE ID as the access code signal 81. The synchroniser identifies the reception of a reply message from the paged slave and informs the controller 60 via the confirmation signal 79.

Referring to FIG. 4, the transceiver illustrated, when functioning as a slave in page scan mode, uses the frequency hopping controller 48 to control the frequency at which it receives messages. The frequency hopping controller 48 receives offset signal 67, access code control signal 69 and control signal 87 from the controller 60. The access code control signal supplies the value of SLAVE ID which is used to derive the slave frequency hopping sequence F. The offset signal 67 supplies a null value. The frequency hopping controller also receives the clock signal having a value $t_s$ and via the control signal 87 the value of T. The frequency hopping controller uses $t_s$ and T to control the timing of the hopping through F in the page scan mode and via the reception frequency control signal 49 the frequency at which messages are received. The controller 60 supplies the value of SLAVE ID to the synchroniser 52 via the access code signal 81. The synchroniser 52 identifies the reception of a message. Furthermore, it discriminates a first type of message from a second type of message. This may be effected by using flags attached to the preamble of a message, by using fixed codes (similar to the Inquiry Code) to differentiate the second message type from the first message type, or by using the inverse of the Access Code which is the preamble to the first type of message for the preamble of the second type of message. The correlation process used within the synchroniser 52 can be simply used to identify the presence of an expected access code (or its inverse) in a header and to differentiate a message using the expected access code from the inverse of the expected access code. The synchroniser supplies the confirmation signal 79 to the controller 60 identifying the type of received paging message. The controller also receives the reception frequency control signal 49. The controller uses the knowledge of the type of paging message received and the frequency of its transmission and a knowledge of the paging scheme used, in particular, U, N, and F' to determine the time at which it should cause the transceiver to transmit and/or to determine the frequency at which the next transmission by the slave should occur.

A slave transceiver when in page scan mode receives either a first paging message or a second paging message first. A first paging message defines the time at which the transmission cycle of the current train ends and the time at which a reply message should be transmitted but it does not specify the frequency of transmission. A second paging message defines the frequency at which a reply message should be transmitted but does not specify the time at which this transmission should occur unless it is also a first message. Having received a first message at a frequency $f_x$ say, the slave knows that there are N/2−1−[x]mod N/2 paging messages still to be received from the master in that transmission cycle. It further knows that these will be transmitted in order, with a frequency $f_i$ or $f_j$ where i=[x+1]mod N, [x+2]mod N, . . . and where j=[x+1+N/2]mod N, [x+2+N/2]mod N. . . . The slave can therefore use the control signal 87 to control its receiver to receive sequentially according to a tracking sequence. The tracking sequence may for example comprise { $f_i, f_{i+1}, f_{i+2}$ . . . } or { $f_{i+N/2}, f_{i+N/2+1}, f_{i+N/2+2}$ . . . } or { $f_i, f_{i+1}, f_{i+N/2+2}, f_{i+N/2+3}, f_{i+4}$ . . . } for each of i=x+1 etc. The use of a tracking sequence increases the probability of receiving a mark code in the remainder of the transmission cycle. If a mark code is not received, in the next train, the slave can receive at frequency $f_x$ at position [x] mod N/2 to try and receive a mark code.

In the preferred embodiment, the second message type is also a first message type and defines not only the frequency at which the slave sends a reply but also the time at which the reply is sent. Once such a second message has been received the slave does not need to receive other messages in the same train.

Once synchronisation with the slave has been established by the master, the master unit communicates network parameters to the slave unit in the payload of a packet while emulating the slave unit's frequency-hopping sequence and keeping in step with the slave. The frequency at which the reply message was transmitted by the slave and received by the master can be used as a common origin in the slave's frequency hopping sequence. The slave and master can therefore remain synchronised by hopping in time through the slave hopping sequence. The network parameters include: the MASTER ID so that the slave unit can recognise packets transmitted by the master unit and can emulate the master unit's frequency-hopping sequence; M_OFFSET so that the slave unit can keep in step with the master unit's time frame and frequency hopping; and L_ADDR so that the slave unit can recognise a packet addressed to it by the master unit. The master and slave then communicate using the master unit's frequency-hopping sequence.

Communication Mode

In the communication mode, a slave can only transmit and must transmit in the slot immediately after that in which it was addressed. An exception to this is if the master unit is broadcasting, that is, transmitting to all slave units simultaneously. All packet$_s$ transmitted in the communication mode have an Access Code determined by the MASTER ID and a frequency determined by the master unit's frequency-hopping sequence. The slave units emulate the master unit's frequency-hopping sequence using the stored value of MASTER ID as the access code control signal 69 and the stored value of M_OFFSET as the value of the offset signal 69 and synchronise their timing to the master unit using their own clock signal 59 and their stored value of M_OFFSET. The master addresses a particular slave unit by placing its unique address, L_ADDR, read from memory 56 in the header of a packet. The payloads of the packet$_s$ transmitted may contain data or control information such as updated network parameters.

Transceivers such as that illustrated in FIG. 4, may form part of different devices such as mobile phones, computers, pagers, a computer mouse, headsets, microphones etc. Such transceivers allow the devices to form a communication network and exchange data or control information via the network.

The preceding description describes a preferred implementation of the claimed invention in a preferred application, namely a low power radio frequency communications network. However, it should be appreciated that other implementations and applications may be utilised without departing from the scope of the invention as claimed.

What is claimed is:

1. A transceiver for paging a device by periodically transmitting a series of messages, comprising:

transmitter means arranged, when enabled, to transmit a series of messages comprising a message at each frequency in a predetermined series of frequencies;

receiver means arranged, when enabled, to receive at, at least a predetermined frequency; and control means arranged to enable said transmitter means and then said receiver means in each of a plurality of successive periods and to provide each message in said series of messages, wherein a series of messages transmitted in a period has a multiplicity of first messages and at least a second message defining the predetermined frequency for that period, wherein the frequency at which said second message is transmitted defines the predetermined frequency, wherein the frequency at which the second message is transmitted equals the predetermined frequency.

2. A transceiver for paging a device by periodically transmitting a series of messages, comprising:

transmitter means arranged, when enabled, to transmit a series of messages comprising a message at each frequency in a predetermined series of frequencies;

receiver means arranged, when enabled, to receive at, at least a predetermined frequency; and control means arranged to enable said transmitter means and then said receiver means in each of a plurality of successive periods and to provide each message in said series of messages, wherein a series of messages transmitted in a period has a multiplicity of first messages and at least a second message defining the predetermined frequency for that period, wherein the second message is a mark code being a radio packet which has as its preamble the inversion of the unique identification of the device being paged.

3. A transceiver for paging a device by periodically transmitting a series of messages, comprising:

transmitter means arranged, when enabled, to transmit a series of messages comprising a message at each frequency in a predetermined series of frequencies;

receiver means arranged, when enabled, to receive at, at least a predetermined frequency; and control means arranged to enable said transmitter means and then said receiver means in each of a plurality of successive periods and to provide each message in said series of messages, wherein a series of messages transmitted in a period has a multiplicity of first messages and at least a second message defining the predetermined frequency for that period, wherein at least a first message in a series of messages transmitted in a period defines when the receiver means is enabled in that period.

4. A transceiver as claimed in claim 3 wherein the frequency at which said first message is transmitted defines when the receiver means is enabled.

5. A transceiver as claimed in claim 3 wherein said control means is further arranged such that during said plurality of periods it provides for the transmission, at each frequency in said predetermined series of frequencies, of a second message in a first period defining the predetermined frequency for the first period and of a first message in a second period defining when said receiver means is enabled in said second period.

6. A transceiver as claimed in claim 5 wherein during said plurality of periods, at the frequencies in said predetermined series of frequencies, there is a multiplicity of first messages transmitted.

7. A transceiver for being paged by a paging transceiver which periodically transmits a series of messages comprising a message at each frequency in an ordered sequence of frequencies and then receives at, at least a response frequency, comprising:

receiver means arranged to receive a message transmitted at a receiving frequency;

transmitter means for transmitting a message at a transmission time with a transmission frequency;

control means arranged to control said transmitter means to establish timing and frequency synchronization between said transmitter means and the paging transceiver, said control means being responsive to the receipt of a message in said ordered sequence to determine at least one of said transmission time and said transmission frequency, wherein the control means is responsive to the receiving frequency on the receipt of a second message type to determine the next transmission frequency, wherein said control means is responsive to the receiving frequency on the receipt of second message type to set said transmission frequency, at the transmission time, to said receiving frequency.

8. A transceiver for being paged by a paging transceiver which periodically transmits a series of messages comprising a message at each frequency in an ordered sequence of frequencies and then receives at, at least a response frequency, comprising:

receiver means arranged to receive a message transmitted at a receiving frequency;

transmitter means for transmitting a message at a transmission time with a transmission frequency;

control means arranged to control said transmitter means to establish timing and frequency synchronization between said transmitter means and the paging transceiver, said control means being responsive to the receipt of a message in said ordered sequence to determine at least one of said transmission time and said transmission frequency, wherein the control means is responsive to the receiving frequency on the receipt of a second message type to determine the next transmission frequency, wherein said control means defines a series of transmission frequencies, said transmission frequency at said transmission time being determined by the receiving frequency of a received preceding second message type in said series.

9. A transceiver for being paged by a paging transceiver which periodically transmits a series of messages comprising a message at each frequency in an ordered sequence of frequencies and then receives at, at least a response frequency, comprising:

receiver means arranged to receive a message transmitted at a receiving frequency;

transmitter means for transmitting a message at a transmission time with a transmission frequency;

control means arranged to control said transmitter means to establish timing and frequency synchronization between said transmitter means and the paging transceiver, said control means being responsive to the receipt of a message in said ordered sequence to determine at least one of said transmission time and said transmission frequency, wherein the ordered sequence is known to the transceiver and determined by the identity of the transceiver, and wherein receipt of a second message from the paging transceiver determines the position of the paging transceiver's transmissions within the predetermined sequence.

10. A transceiver for being paged by a paging transceiver which periodically transmits a series of messages comprising a message at each frequency in an ordered sequence of frequencies and then receives at, at least a response frequency, comprising:

receiver means arranged to receive a message transmitted at a receiving frequency;

transmitter means for transmitting a message at a transmission time with a transmission frequency;

control means arranged to control said transmitter means to establish timing and frequency synchronization between said transmitter means and the paging transceiver, said control means being responsive to the receipt of a message in said ordered sequence to determine at least one of said transmission time and said transmission frequency, wherein the sequence of messages includes a multiplicity of first messages and at least a second message wherein at least one first messages precedes the second message in the sequence, the control means being arranged to hop through a tracking sequence of receiving frequencies after the receipt of a first message to receive the second message, said hoping being determined by the frequency at which said first message is received.

11. A transceiver as claimed in claim 10 wherein each tracking sequence is an ordered sequence beginning at said frequency at which said one message was received but not including that frequency.

12. A system comprising a first transceiver and a second transceiver, wherein the first transceiver is arranged to page the second transceiver by periodically transmitting a series of messages comprising a message at each frequency in an predetermined sequence of frequencies, the second transceiver being arranged to use predictively the predetermined nature of the sequence wherein the first transceiver comprises transmitter means arranged, when enabled, to transmit the series of messages;

receiver means arranged, when enabled, to receive at, at least a predetermined frequency; and control means arranged to enable said transmitter means and then said receiver means in successive periods and the second transceiver comprises:

receiver means arranged to receive a message transmitted at a receiving frequency;

transmitter means for transmitting a message at a transmission time with a transmission frequency;

control means arranged to control said transmitter means to establish timing and frequency synchronisation between said transmitter means and the first transceiver, said control means being responsive to the receipt of a message in the series transmitted by the first transceiver to predict at least one of said transmission time and said transmission frequency.

13. A transceiver for paging a device by periodically transmitting a series of messages, comprising:

transmitter means arranged, when enabled, to transmit a series of messages including a message at each frequency in a predetermined series of frequencies;

receiver means arranged, when enabled, to receive at, at least a predetermined receiving frequency; and control means arranged to enable said transmitter means and then said receiver means in each of a plurality of successive periods and to provide each message in said series of messages wherein the series of messages transmitted in a period includes a mark code message indicating a predetermined receiving frequency for that period.

14. A transceiver as claimed in claim 13, wherein said predetermined series of frequencies is an ordered series, said ordering being dependent upon the frequencies in the series.

15. A transceiver as claimed in claim 13, wherein a series of messages transmitted in a period has a multiplicity of first messages and at least one mark code message wherein the first messages indicate the transmission time of the mark code.

16. A transceiver as claimed in claim 13, wherein said mark code message in the period additionally defines when the receiver means is enabled in the period.

17. A transceiver as claimed in claim 13, wherein a series of messages transmitted in a period has a multiplicity of first messages and at least one mark code message wherein the first messages indicate when the receiver means is enabled in the period and the mark code indicates the receiving frequency of the receiver means when enabled.

18. A transceiver as claimed in claim 13, wherein the frequency at which said mark code message is transmitted defines the predetermined receiving frequency.

19. A transceiver as claimed in claim 18, wherein the frequency at which the mark code message is transmitted equals the predetermined receiving frequency.

20. A transceiver as claimed in claim 13, wherein the mark code message is a radio packet which has as its preamble an inversion of a unique identification of the device being paged.

21. A transceiver as claimed in claim 13, wherein a mark code message is transmitted in each of the series of messages.

22. A transceiver as claimed in claim 13, wherein said predetermined series of frequencies is the same for each period for at least said plurality of periods.

23. A transceiver as claimed in claim 13, wherein said predetermined series of frequencies is predetermined by the identity of the device being paged.

24. A transceiver as claimed in claim 23, wherein said predetermined series of frequencies is a sub-set of a slave hopping sequence.

25. A transceiver as claimed in claim 13, wherein said predetermined series of frequencies includes an estimate of the frequency at which the device being paged is receiving.

26. A transceiver as claimed in claim 13, wherein said control means is arranged to vary said predetermined series of frequencies in dependence upon an estimate of the timing of the device being paged.

27. A transceiver as claimed in claim 13, wherein said receiver means is controlled by said control means to receive at one predetermined frequency in each period.

28. A transceiver as claimed in claim 13, wherein said receiver means is controlled by said control means to receive at a succession of different predetermined frequencies in one period.

29. A transceiver as claimed in claim 13, wherein the predetermined receiving frequency varies from one period to the next period, forming a series which repeats once every plurality of periods.

30. A mobile phone, an accessory for a mobile phone or a communications system comprising a transceiver as claimed in claim 13.

31. A transceiver for paging a device by periodically transmitting a series of messages, comprising:

transmitter means arranged, when enabled, to transmit a series of messages including a message at each frequency in a predetermined series of frequencies;

receiver means arranged, when enabled, to receive at, at least a predetermined receiving frequency; and control means arranged to enable said transmitter means and then said receiver means in each of a plurality of successive periods and to provide each message in said series of messages wherein the series of messages transmitted in a period includes a mark code message indicating a predetermined receiving frequency for that period and the series of messages transmitted in a period includes a multiplicity of first messages indicating the transmission time of the mark code message.

32. A transceiver for being paged by a paging transceiver which periodically transmits a series of messages including a message at each frequency in an ordered sequence of frequencies and then receives at least a response frequency, said transceiver comprising:

receiver means arranged to receive a message transmitted at a receiving frequency;

transmitter means for transmitting a message at a transmission time with a transmission frequency; and control means arranged to control said transmitter means to establish timing and frequency synchronization between said transmitter means and the paging transceiver, said control means being responsive to receipt of a mark code message in said ordered sequence of messages to determine said transmission frequency and said transmission time.

33. A transceiver as claimed in claim 32, wherein said control means specifies the size of the series and its ordering.

34. A transceiver as claimed in claim 32, wherein the control means is responsive to the receiving frequency on the receipt of the mark code message to determine the next transmission frequency.

35. A transceiver as claimed in claim 34, wherein said control means is responsive to the receiving frequency on the receipt of the mark code message to set said transmission frequency, at the transmission time, to said receiving frequency.

36. A transceiver as claimed in claim 34, wherein said control means defines a series of transmission frequencies, said transmission frequency at said transmission time being determined by the receiving frequency of a received preceding mark code message.

37. A transceiver as claimed in claim 32, wherein said control means is responsive to the receipt of a mark code message to determine said transmission time.

38. A transceiver as claimed in claim 32, wherein said control means is responsive to the receipt of a first message type to enable the reception of the mark code message.

39. A transceiver as claimed in claim 32, wherein said control means is responsive to the receiving frequency on the receipt of a first message type to determine said transmission time.

40. A transceiver as claimed in claim 32, wherein the mark code message is identified by correlation of the inversion of the unique identification of the transceiver with the preamble of a received message.

41. A method of paging a device using a paging transceiver, said method comprising the steps of periodically:

(a) transmitting a series of messages including a message at each frequency in a predetermined sequence of frequencies, said series of messages being ordered dependent upon the frequencies at which they are transmitted and including at least one mark code message;

(b) then receiving at least a predetermined frequency indicated by the transmitted mark code message; and (c) then, if a message is not received, changing said predetermined frequency and repeating steps (a) to (c).

42. A method as claimed in claim 41, further comprising altering the series of messages transmitted in step a) for each iteration.

43. A method as claimed in claim 41, wherein said predetermined sequence of frequencies alters in a predetermined manner for each iteration.

44. A method as claimed in claim 41, wherein said predetermined sequence of frequencies is determined by:

estimating the frequency at which the device will be receiving;

calculating the next most likely frequencies at which the device will be receiving; and creating a sequence from said estimated and calculated frequencies.

45. A system comprising:

a first transceiver; and a second transceiver, wherein said first transceiver is arranged to page said second transceiver by periodically transmitting a series of messages including a message at each frequency in a predetermined sequence of frequencies, wherein said second transceiver is arranged to use predictively the predetermined nature of the sequence, wherein said first transceiver comprises:

first transmitter means arranged, when enabled, to transmit the series of messages, first receiver means arranged, when enabled, to receive at, at least a predetermined frequency, and first control means arranged to enable said first transmitter means and then said first receiver means in successive periods, wherein said second transceiver comprises:

second transmitter means for transmitting a message at a transmission time with a transmission frequency, second receiver means arranged to receive a message transmitted at a receiving frequency, and second control means arranged to control said second transmitter means to establish timing and frequency synchronization between said second transmitter means and said first transceiver, and wherein said second control means is responsive to receipt of first messages in the series transmitted by said first transceiver to receive a second message in the series transmitted by the first transceiver and is responsive to receipt of the second message to predict said transmission time and said transmission frequency.

46. A transceiver for being paged by a paging transceiver which periodically transmits a series of messages including a message at each frequency in an ordered sequence of frequencies and then receives at, at least a response frequency, comprising:

receiver means arranged to receive a message transmitted at a receiving frequency;

transmitter means for transmitting a message at a transmission time with a transmission frequency; and control means arranged to control said transmitter means to establish timing and frequency synchronization between said transmitter means and the paging transceiver, said control means being responsive to receipt of a message in said ordered sequence of frequencies to determine at least one of said transmission time and said transmission frequency.

47. A transceiver as claimed in claim 46, wherein said control means is responsive to the receiving frequency on the receipt of a message to determine a next transmission frequency.

48. A transceiver as claimed in claim 47, wherein said control means is responsive to the receiving frequency on the receipt of the message to set said transmission frequency, at the transmission time, to said receiving frequency.

49. A transceiver as claimed in claim 47, wherein said control means defines a sequence of transmission frequencies, said transmission frequency at said transmission time being determined by the receiving frequency of a received preceding message in said series.

* * * * *